No. 854,299. PATENTED MAY 21, 1907.
C. I. MATSON.
MOTOR SKATE.
APPLICATION FILED MAY 17, 1906.
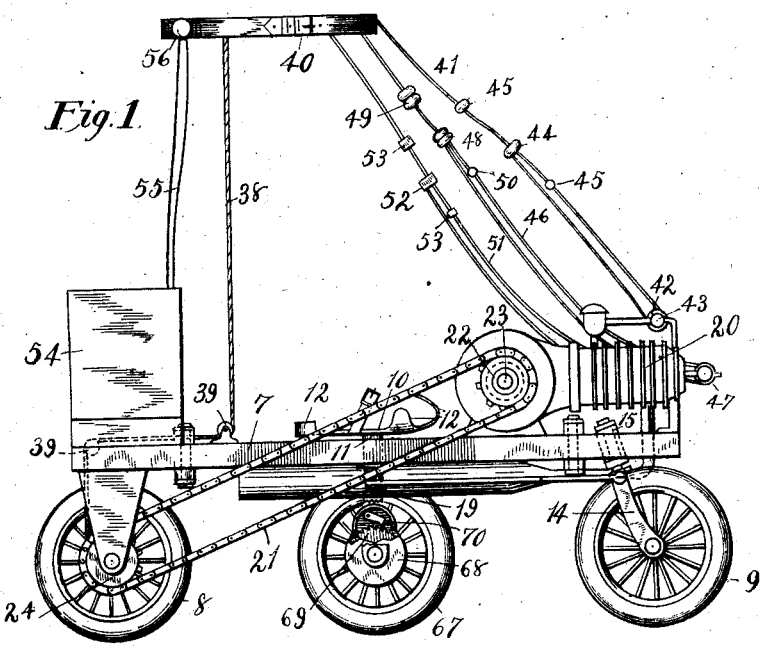
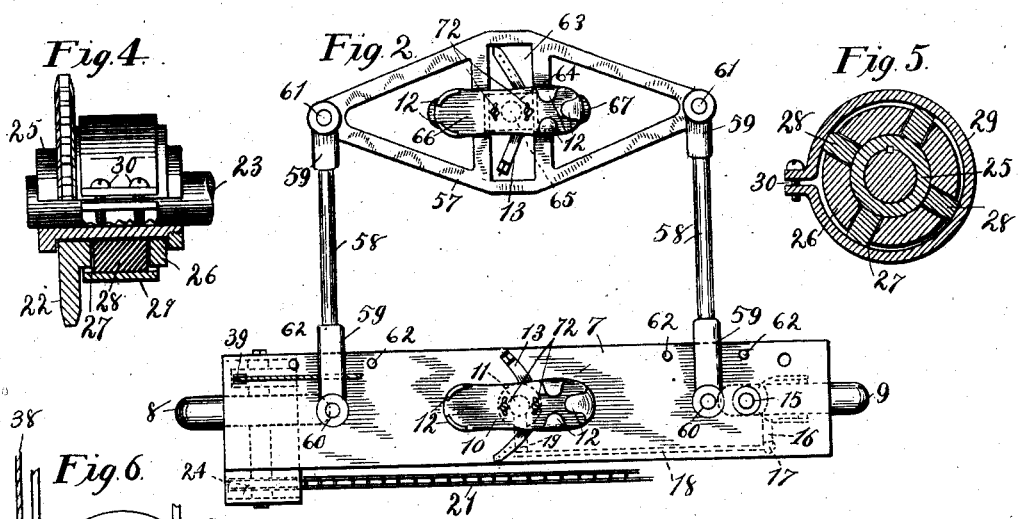
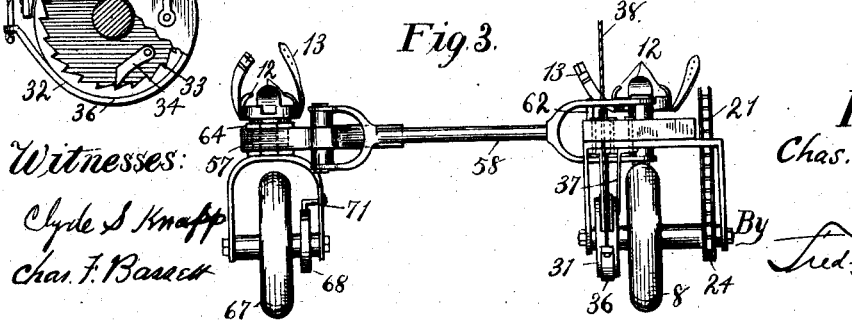
Witnesses:
Clyde S. Knapp
Chas. F. Bassett
Inventor
Chas. I. Matson
By Fred K. Benjamin
Atty.

UNITED STATES PATENT OFFICE.

CHARLES I. MATSON, OF CHICAGO, ILLINOIS.

MOTOR-SKATE.

No. 854,299.        Specification of Letters Patent.        Patented May 21, 1907.

Application filed May 17, 1906. Serial No. 317,314.

*To all whom it may concern:*

Be it known that I, CHARLES I. MATSON, a citizen of the United States, residing at Chicago, in the county of Cook and State of Illinois, have invented certain new and useful Improvements in Motor-Skates, of which the following is a specification.

My invention relates to motor vehicles and especially to that class designed to be attached to the feet and commonly designated as motor skates.

The chief objects of my invention are to provide a motor skate which can be attached to the feet of the operator, and which can be controlled jointly by the feet and hands.

Another object of my device is to provide means for flexibly connecting the running gear attached to the feet so as to secure proper co-operation between them.

Further objects are to provide means for propelling the vehicle independently of the motor, and to prevent damage to the mechanism in case there should be a reverse movement of the motor.

I attain these and other minor results by the use of a plate or frame for each foot flexibly connected so as to be interdependent and supported on wheels provided with pneumatic tires; a motor and its appurtenances including oil storage and controlling means, and a steering mechanism, as fully described and illustrated in the accompanying drawing which forms a part of this specification, and in which—

Figure 1 is a side elevation of my improved subjoined motor skate; Fig. 2 is a top plan view with the motor and its attachments removed; Fig. 3 is a rear elevation with the motor and its attachments removed; Fig. 4 is an enlarged fragmentary view, partly in section, of the yielding gear; Fig. 5 is a cross section of the same; Fig. 6 is a side view, enlarged, of the combined ratchet and band brake, one of the side plates being broken away to disclose the ratchet.

Referring to the drawing, the numeral 7 indicates a bed plate provided with two supporting wheels 8, 9, arranged tandem furnished with pneumatic tires 8ª, 9ª, and a foot plate 10, mounted upon a centrally located pivot post 11 and provided with toe, side and heel clips 12 and a strap 13, by means of which the foot of the operator can be firmly secured to the plate. The front wheel 9 is journaled in a fork 14 which is pivoted at an angle with the bed plate 7 in a bearing 15 and provided with a horizontal arm 16 which is connected by a universal joint 17 with one end of a link-rod 18 the other end of which is pivotally connected with an arm 19 attached to the pivot post 11.

A motor 20, of any approved type, is carried upon the forward part of the bed plate 7 and transmits power to the wheel 8 by means of a chain 21 which engages a yielding sprocket 22 secured to the motor shaft 23, and a fixed sprocket 24, mounted on the axle of the wheel 8. In order to prevent breaking of the chain 21 should the motion of the motor be reversed by premature explosion, I provide a sleeve 25 keyed to the shaft 23 and channeled to receive a loose sleeve 26 formed integral with the sprocket 22. The sleeve 26 is furnished with spaced openings 27 in which are inserted blocks 28 of some suitable material, preferably fiber, and held in frictional engagement with the fixed sleeve 25 by the pressure of a band 29, the force of its compression being regulated by adjusting bolts 30.

The rear wheel 8 is furnished with a ratchet 31 secured to the axle and having an internal ratchet ring 32 furnished with teeth 33 with which a dog 34 engages. The side plates 35 are of larger diameter than the ratchet ring and form a peripheral groove to receive a brake band 36 fastened at one end to a support 37 which depends from the under side of the bed plate, and to the other end is attached a cord 38 which runs over pulleys 39 and extends upward to be secured to a belt 40 worn about the waist of the operator.

One end of a flexible cord 41 is attached to said belt the other end passing around a pulley 42 attached to the throttle valve 43 and is secured to a spherical block 44 adapted to slide on the cord 41, its movement thereon being limited by stops 45 fixed to said cord. A similar flexible cord 46 is connected in the same way to the exhaust 47 one end being secured to a grooved block 48, limited in movement by stops 50. A third cord 51 is attached to the belt and thence runs to the spark advancing device which it controls returning to be fastened to a cube shaped block 52 running on the cord and having stops 53 to limit its excursion. At the rear of the bed plate is located a box 54 which contains the oil tank, batteries and spark coil. From the battery insulated conductors 55 lead to a switch 56 attached to the belt 40 for closing circuit in starting motor.

A light frame 57 is flexibly joined to the bed plate 7 by tubular members 58 which are brazed to forks 59, journaled on bearings 60, 61, in the bed plate 7 and frame 57 respectively, their movements on said bearings being limited by stops 62 fixed in the bed plate. The frame 57 is provided with a central opening 63 in which is slidably mounted a block 64 in which is journaled a vertical post 65 its upper end carrying a foot plate 66, secured to the foot of the operator in the same manner as the plate 10 hereinbefore described. The lower end of said post 65 is bifurcated to form bearings for a wheel 67 provided with a pneumatic tire 67$^a$. Upon the axle of this wheel is mounted a ratchet casing 68, containing a ratchet plate 69 keyed to the axle and a dog 70 fixed to said casing and engaging with the teeth in said plate to prevent a backward movement of the wheel 67. A support 71 fixed to one arm of the fork prevents rotation of the ratchet casing 68 when engaged by the dog. The foot plates 10 and 67 are provided with set screws 72 which permit the said plates to be set at any angle desired.

The method of using the apparatus is as follows: The operator places his right foot upon the plate 10 and the left upon the plate 66 and fastens them firmly thereto by means of the straps 13. There will be no difficulty in standing erect as the subjoined members 58 with their forked bearings give a broad foundation and this special construction affords a rigid combination that will thoroughly resist any torsional strain. The operator having fastened the belt about his waist, is then ready to proceed. In order to start the motor the operator moves first one foot and then the other in a forward direction with a gliding or skating movement. This he can easily do since the ratchets 31 and 68 prevent any backward motion of the wheels. As soon as a sufficient momentum is acquired to produce the automatic action of the motor the throttle and other valves can be properly manipulated by means of the cords 41, 46 and 51. In order to facilitate the operation of the machine and to enable the operator to govern the engine entirely by touch the blocks attached to each individual cord having a separate and special function are made of similar shape but differ in size and form from those attached to the other cords.

Several methods may be used for braking or retarding the momentum of the apparatus. Besides the use of the band brake 36, the operator can effectively retard the motion by turning the foot-plates upon their pivot posts so that the toes of both feet point inwardly, in which position the wheel under the left foot and the forward wheel under the right will be turned obliquely to the line of motion and will have a sliding or skidding movement thus bringing the machine to a sudden stop. The left foot-plate is provided with a lateral movement by means of the sliding block 64 in order to allow of ready adjustment of the distance between the foot plates without changing the relation of the joining members 58 to the line of motion. This will give an opportunity of avoiding small obstructions and in conjunction with the ability to approximate the frame 57 and the bed plate 7 will afford great assistance in manipulating the apparatus.

It is obvious that many changes may be made in the devices of my invention as herein set forth without departing from the spirit and scope thereof, and I do not, therefore, wish to be limited to the precise construction shown.

Having thus described my invention what I claim is:—

1. In apparatus for the purpose specified, a flexible foot supporting frame, a motor arranged on said frame, a pair of foot-plates attached to said frame, wheels supporting the frame, and gearing connecting the motor to one of said wheels.

2. In apparatus for the purpose specified, a flexible foot supporting frame composed of a plurality of subjoined members, a motor carried upon the frame, wheels supporting the framework, means including a pair of foot-plates for securing the feet of the operator to said frame, means for steering the apparatus, and gearing connecting the motor and one of the wheels.

3. An apparatus for the purpose specified including a flexible frame composed of a plurality of subjoined members, a motor, a plurality of wheels supporting the frame, foot-plates mounted upon the frame, means for securing the feet of the operator to said foot plates, and steering means for the apparatus, said steering means controlled by the feet of the operator.

4. An apparatus for the purpose specified including a plurality of conjoined members, flexible connections between said members, a motor, a plurality of supporting wheels, driving gears connecting the motor with one of said wheels, foot plates attached to said members, means for securing the feet of the operator to said plates, steering means controlled by the feet of the operator, and means for retarding the forward movement of the apparatus.

5. An apparatus for the purpose specified including a plurality of members adjustably connected, a motor, a plurality of supporting wheels for the said members, driving gear connecting the motor with one of said wheels, foot plates secured to the said members and provided with means for securing the feet of the operator thereto, steering means controlled by the feet of the operator, a brake for the driven wheel and means for varying the distance between the foot plates.

6. An apparatus for the purpose specified including a framework composed of a plurality of subjoined members, means for varying the distance between the members, a motor carried in said framework, a plurality of wheels supporting the framework, gear connections between the motor and one of said wheels, means for securing the feet of the operator to said subjoined members, means for guiding the apparatus in its forward movement, means for retarding the momentum of the apparatus, means for varying the distance between the feet of the operator independently of the said means for varying the distance between the subjoined members, a belt for the body of the operator and flexible controlling means for the motor attached to said belt.

7. An apparatus for the purpose specified including a framework composed of a plurality of subjoined members, means for varying the distance between said members, a motor carried on said framework, a plurality of wheels supporting the framework, gear connection between the motor and one of said wheels, foot plates carried by said members and adapted to be secured to the feet of the operator, means for steering the apparatus, a brake, means for varying the distance between the foot plates independently of the means for varying the distance between the members, a belt adapted to be worn by the operator, flexible controlling means for the motor attached to said belt, means for differentiating said controlling means, and means for preventing injury to the mechanism if the motor is reversed by a premature explosion.

8. An apparatus for the purpose specified including a framework composed of a plurality of subjoined members, means for varying the distance between said members, a motor carried on one of the members, a plurality of wheels supporting the framework and provided with pneumatic tires, gear connections between the motor and one of said wheels, foot-plates pivoted upon said members and adapted to be secured to the feet of the operator, steering means, a brake manually operated, means for starting the motor, means for varying the distance between said foot-plates, a belt adapted to be worn by the operator, flexible controlling cords for the motor attached to said belt, means for differentiating the several controlling cords and means for preventing injury to the mechanism by a premature explosion in the cylinder of the motor.

9. An apparatus for the purpose specified including a frame composed of a plurality of flexibly joined members, stops for limiting the movement of said members in their mutual relation, a motor carried on said frame, a plurality of wheels supporting said frame, a yielding sprocket mounted upon the motor shaft, a fixed gear mounted upon one of the said wheels, a chain connecting the yielding gear with the fixed gear, foot-plates pivotally secured to the frame, means for adjusting said plates at different angles, steering means operated by the feet, a manually operated brake, a plurality of ratchets to prevent the backward movement of said wheels supporting the frame, means for varying the distance between said foot plates without changing the relative position of the said flexibly joined members, a belt adapted to be worn by the operator, flexible controlling cords for the motor attached to said belt, means for differentiating the several controlling cords, and pneumatic tires for the said wheels supporting the frame.

In testimony whereof I affix my signature in presence of two witnesses.

CHARLES I. MATSON.

Witnesses:
GEO. L. PATTERSON,
MATT. M. MARTY.